United States Patent
Longo et al.

(10) Patent No.: US 9,898,524 B2
(45) Date of Patent: Feb. 20, 2018

(54) MANAGING A CLASSIFICATION SYSTEM AND ASSOCIATED SELECTION MECHANISM

(71) Applicant: International Business Machines Corporation, Armonk, NY (US)

(72) Inventors: Deirdre S. Longo, Morro Bay, CA (US); Jenifer Schlotfeldt, Oro Valley, AZ (US); Michael F. Priestley, Toronto (CA); Wen Ke Xue, Jiangsu (CN); Yi Yan Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 684 days.

(21) Appl. No.: 14/084,799

(22) Filed: Nov. 20, 2013

(65) Prior Publication Data

US 2014/0149413 A1 May 29, 2014

(30) Foreign Application Priority Data

Nov. 23, 2012 (CA) .................... 2796502

(51) Int. Cl.
  *G06F 7/00* (2006.01)
  *G06F 17/30* (2006.01)

(52) U.S. Cl.
  CPC .. *G06F 17/30598* (2013.01); *G06F 17/30734* (2013.01)

(58) Field of Classification Search
  CPC ......... G06F 17/30867; G06F 17/30265; G06F 17/30598
  See application file for complete search history.

(56) References Cited

U.S. PATENT DOCUMENTS 8,381,095 B1 * 2/2013 Fischer ..................... 715/234
2004/0205585 A1 * 10/2004 McConnell ......... G06F 17/2205 715/201

(Continued)

FOREIGN PATENT DOCUMENTS

CA    2796502 A1    5/2014

OTHER PUBLICATIONS

Medynskiy, Y. et al., "Exploring Websites Through Contextual Facets," Proc. of the SIGCHI Conf. on Human Factors in Computing Systems, Apr. 4-9, 2009, ACM, 10 pg.

(Continued)

*Primary Examiner* — Hasanul Mobin
(74) *Attorney, Agent, or Firm* — Cuenot, Forsythe & Kim, LLC (57) ABSTRACT

Generating a wizard includes receiving a scheme as an input source to form a received scheme, wherein the received scheme is a taxonomy, receiving a defined set of content files to form received content files, and loading the received content files and the received scheme. The received content files can be tagged using the received scheme. A wizard can be generated using the received scheme. The generated wizard is capable of use with an application utilizing the scheme, wherein a change in the received scheme is directly represented in the generated wizard.

17 Claims, 5 Drawing Sheets

(56) References Cited

U.S. PATENT DOCUMENTS

| | | | |
|---|---|---|---|
| 2004/0254953 A1* | 12/2004 | Vincent, III | G06F 17/2247 |
| 2005/0172261 A1* | 8/2005 | Yuknewicz | G06F 8/38 717/106 |
| 2005/0182772 A1* | 8/2005 | Mital | G06F 17/30569 |
| 2006/0173821 A1* | 8/2006 | Hennum et al. | 707/3 |
| 2007/0106658 A1* | 5/2007 | Ferrari et al. | 707/5 |
| 2007/0233654 A1 | 10/2007 | Karlson et al. | |
| 2008/0021925 A1* | 1/2008 | Sweeney | G06F 17/30914 |
| 2009/0058847 A1 | 3/2009 | Lewis | |
| 2009/0228525 A1* | 9/2009 | Fridrich | G06Q 10/10 |
| 2009/0234864 A1 | 9/2009 | Ellis et al. | |
| 2010/0036789 A1 | 2/2010 | Marleau | |
| 2010/0198844 A1* | 8/2010 | Ribbe | G06F 8/35 707/755 |
| 2010/0287188 A1* | 11/2010 | Kakar | G06Q 10/06 707/769 |
| 2011/0131210 A1 | 6/2011 | Bierner | |
| 2011/0313966 A1* | 12/2011 | Schmidt | G06Q 10/10 706/52 |

OTHER PUBLICATIONS

Koren, J. et al., "Personalized Interactive Faceted Search," Proc. of the 17th Int'l Conf. on World Wide Web, Apr. 21-25, 2008, pp. 477-486, ACM.

"Darwin Information Typing Architecture (DITA), OASIS Standard" [online] Ver. 1.2, Dec. 1, 2010, retrieved from the Internet: <http://docs.oasis-open.org/dita/v1.2/spec/DITA1.2-spec.html>, 16 pg.

"New research from Outsell's Gilbane Group Identifies Smart Contest as Key to Broad Enterprise Adoption of XML," [online] Bluebill Advisors, Inc. © 2010, Sep. 30, 2010, retrieved from the Internet: <http://gilbane.com/2010/09/new_research_from_outsells_gilbane_group_identifies_smart_content_as_key_to_broad_enterprise_adoptio/>, 5 pg.

"2.1.2.2.5 Subject scheme maps," [online] OASIS Open © 2005, 2010, Dec. 1, 2010, retrieved from the Internet: <http://docs.oasis-open.org/dita/v1.2/os/spec/archSpec/subjectSchema.html#subjectSchema>, 3 pg.

\* cited by examiner

MANAGING A CLASSIFICATION SYSTEM AND ASSOCIATED SELECTION MECHANISM

CROSS-REFERENCE TO RELATED APPLICATIONS

This application claims the benefit of Canada Application Number 2796502 filed on Nov. 23, 2012, which is fully incorporated herein by reference.

BACKGROUND

Richly classified and structured content enables many useful applications, including faceted browsing and filtered search, dynamically personalized web pages or books. This type of content may also be referred to as smart content (Gilbane in a smart content study (co-sponsored by IBM®)).

Common problems arising when using the content include having the content classified correctly, understanding relationships between classification values and enabling the values to be easy for users to select or navigate.

The Darwin Information Typing Architecture (DITA) 1.2 standard (OASIS DITA 1.2 specification, section on classification) provides a standardized solution addressing the problem of classifying and the problem of relating values with an extensible markup language (XML) format for classification schemes. DITA therefore enables XML data for authoring and publishing activities. The format provides control over values available to classifiers (such as original authors and publisher) and also provides a hierarchy for the values, which establishes relationships between the values. The hierarchy can also be used to expose values for user selection.

However, in instances in which classification schemes contain many facets and complex interdependencies, a typical user cannot be expected to select appropriate values to address a specific problem or a filtering scenario without a degree of guidance beyond that which is provided in a simple hierarchical browse.

Typically, in the case of complex schemes, the user is guided through a series of choices using a wizard or other form of coaching interface. This type of guidance typically solves the user problem but also creates maintenance and translation issues for the original authors and publishers. For example, maintenance issues occur when the classification scheme changes, because the guidance must be changed in the classification scheme, and also in the wizard for navigating or selecting from the scheme.

In another example, exploring websites through contextual facets uses dynamic generation of facets, which may be browsed, from discovered metadata in pages. The example however does not enable use of pre-existing taxonomies, or generation of wizards for complex facet selection. A further example deals with automatic personalization of content by dynamic selection of facets, with minimal interaction from a user. The further example does not address management of taxonomies or the design of guided selection experiences.

Another solution example provides a capability to navigate any given hierarchically organized value set, but does not provide a method for generating a guided selection experience (for example, a wizard) to handle complex facet selection scenarios, including inter-related facets. In a similar example, a capability is provided to navigate and select from a combination of facets and tags; however guided selection or single sourcing between a wizard and a taxonomy source is not provided. A further mechanism provides a capability of merging of multiple facets for consolidated search across domains using a mix of different facets. However guided selection or single sourcing between a wizard and a taxonomy source is not provided by the mechanism.

Another mechanism purported to resolve the problems provides a capability for deploying an enterprise-wide taxonomy, with methods for identifying relationships between nodes in the taxonomy that could be used to affect interface display. However the mechanism does not provide support for single sourcing of a guided selection interface and a taxonomy. A similar mechanism provides a capability for guided navigation of search results using taxonomies, potentially derived from a variety of sources including dynamic analysis, and ontologies. The described mechanism does not include guided navigation for the initial selection of a set of related terms, using the taxonomy document itself as a single source for both an allowed value list used by a search engine and a wizard interface used to guide the user through the selection process.

SUMMARY

An embodiment includes a computer-implemented process for generating a wizard. The computer-implemented process includes receiving a scheme as an input source to form a received scheme, wherein the received scheme is a taxonomy, receiving a defined set of content files to form received content files, and loading the received content files and the received scheme. The computer-implemented process also can include tagging the received content files using the received scheme. The computer-implemented process further can include generating a wizard using the received scheme to create a generated wizard capable of use with an application utilizing the scheme, wherein a change in the received scheme is directly represented in the generated wizard.

Another embodiment includes a computer program product for generating a wizard. The computer program product includes a non-transitory computer recordable-type media containing computer executable program code stored thereon. The computer executable program code is executed by a processor unit to perform a method. The method includes receiving, using the processing unit, a scheme as an input source to form a received scheme, wherein the received scheme is a taxonomy; receiving, using the processing unit, a defined set of content files to form received content files; loading, using the processing unit, the received content files and the received scheme; tagging, using the processing unit, the received content files using the received scheme; and generating, using the processing unit, a wizard using the received scheme to create a generated wizard capable of use with an application utilizing the scheme, wherein a change in the received scheme is directly represented in the generated wizard.

According to another embodiment, an apparatus for generating a wizard includes a memory containing computer executable program code and a processor unit configured to execute the computer executable program code to direct the apparatus to receive a scheme as an input source to form a received scheme, wherein the received scheme is a taxonomy, receive a defined set of content files to form received content files, and load the received content files and the received scheme. The processor unit further executes the computer executable program code to direct the apparatus to tag the received content files using the received scheme and to generate a wizard using the received scheme to create a generated wizard capable of use with an application utilizing the scheme, wherein a change in the received scheme is directly represented in the generated wizard.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

This disclosure relates generally to content management in a data processing system and more specifically to managing a classification scheme and associated selection mechanism in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
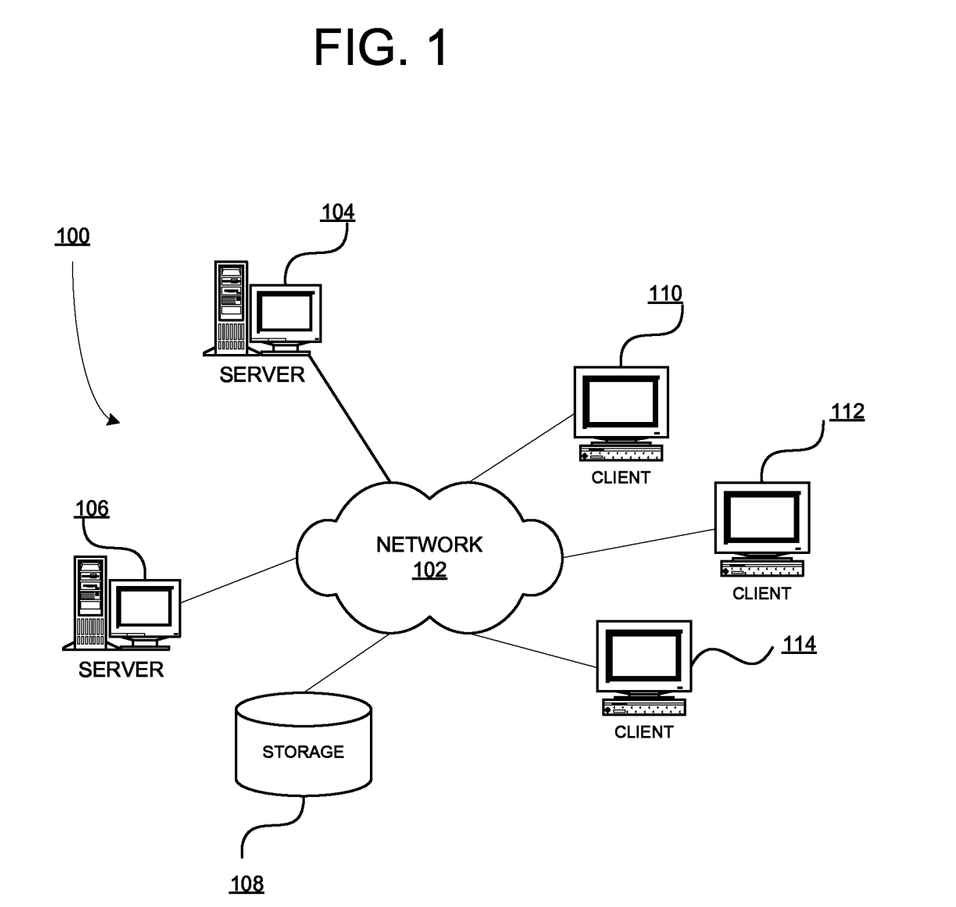
FIG. 1 is a block diagram of an exemplary network data processing system operable for various embodiments of the disclosure.
Figure 2:
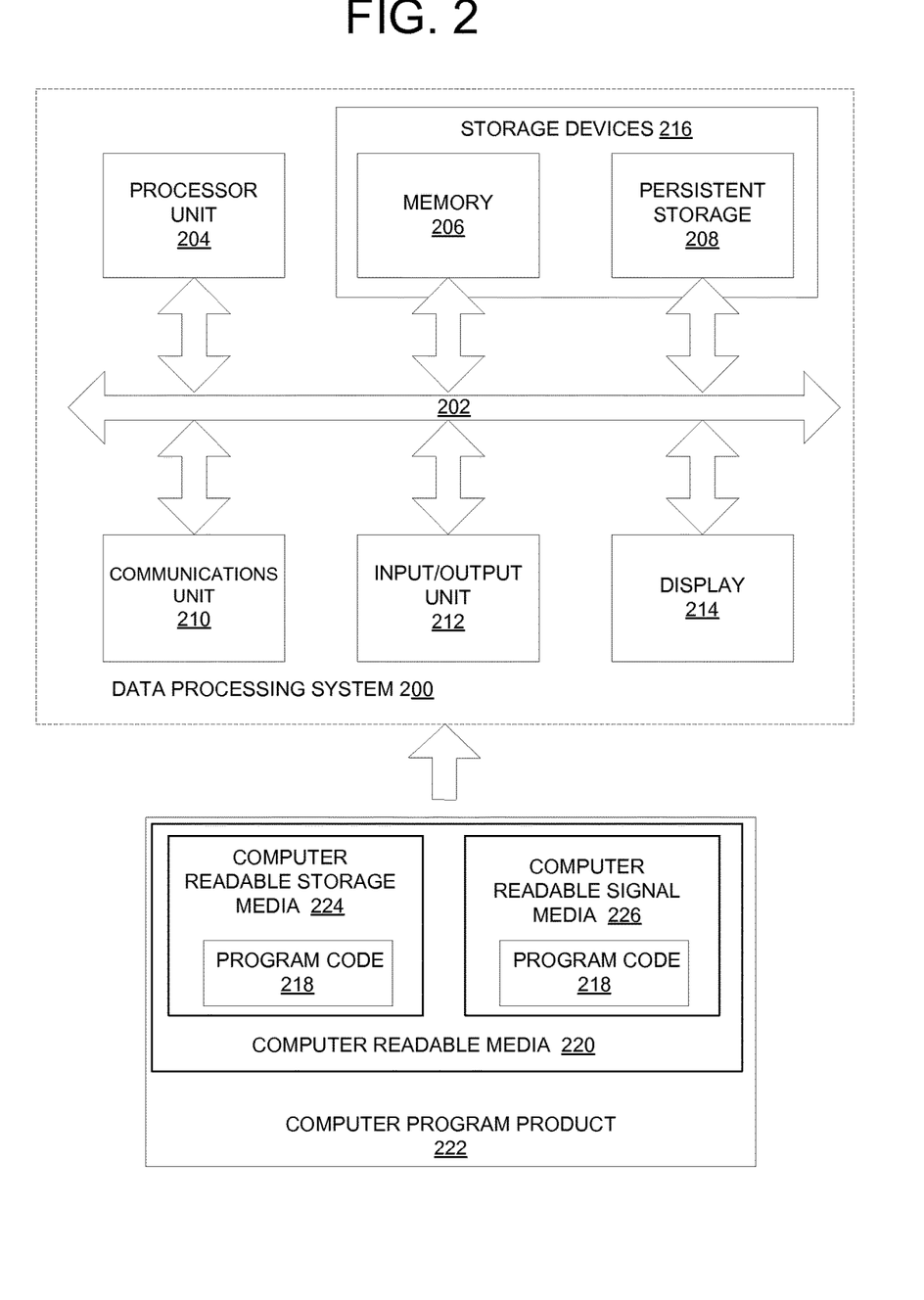
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments for managing a classification scheme and associated selection mechanism may be implemented. It should be appreciated that FIGS. 1-2 are only exemplary and are not intended to assert or imply any limitation with regard to the environments in which different embodiments of managing a classification scheme and associated selection mechanism may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments of managing a classification scheme and associated selection mechanism may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example of managing a classification scheme and associated selection mechanism, data processing system 200 includes communications fabric 202, which provides communications between processor unit 204, memory 206, persistent storage 208, communications unit 210, input/output (I/O) unit 212, and display 214.

Processor unit 204 serves to execute instructions for software for managing a classification scheme and associated selection mechanism that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments of managing a classification scheme and associated selection mechanism may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. Typically the computer recordable storage media is referred to as non-transitory computer recordable storage media or a medium when referring to a single instance. In some instances, computer readable storage media 220 may not be removable.

Alternatively, program code 218 for managing a classification scheme and associated selection mechanism may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 for managing a classification scheme and associated selection mechanism may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for managing a classification scheme and associated selection mechanism for generating a wizard is presented. Processor unit 204 receives a scheme as an input source to form a received scheme, wherein the received scheme is a taxonomy. Processor unit 204 receives a defined set of content files to form received content files Processor unit 204 loads the received content files and the received scheme. Processor unit 204 tags the received content files using the received scheme.

Processor unit 204 generates a wizard using the received scheme to create a generated wizard capable of use with an application utilizing the scheme, wherein a change in the received scheme is directly represented in the generated wizard.

An embodiment of the disclosed process of managing a classification scheme and associated selection mechanism enables generation of a wizard for completion of selections from a formal pre-existing taxonomy, in which the taxonomy and the wizard are sourced from a single XML document. Using an embodiment of the disclosed process, a classification scheme document is enhanced with additional information including a logical grouping of values, additional labels and guiding text, whether the values are multiple-select or mutually exclusive enabling the wizard to be rendered directly as a view of the classification scheme.

New wizard pages are created using the logical groupings, and value choices are rendered as radio buttons, checkboxes, or drop-down lists depending on the type of selection allowed and the number of values presented. An embodiment of the disclosed process typically resolves a problem of maintaining multiple value descriptions and relationship logic in both entities of a scheme and a wizard because using the embodiment, when the scheme is updated, the wizard updates as well.

The wizard can also be created from a separate classification scheme that does not declare new values, but references existing values in the master scheme of a scheme hierarchy. The new classification scheme enables selection and organization of a subset of values, making navigation and selection for a specific problem or scenario easier without compromising the integrity of the master scheme.

Multiple partial schemes can accordingly all make use of the same master scheme, without needing to re-declare common labels or value descriptions. While use of a partial scheme does create some dual maintenance, there is no duplication of translation effort, and the wizard is still generated from an easily authored and maintained XML file with a clear relationship, which is validated, to the classification scheme, rather than being hand-coded or generated from a generic wizard framework as is currently performed in typical solutions.

Because the wizard is tied directly to the classification scheme, the wizard can also be used for any application that utilizes the scheme. Therefore the same wizard can be used to set user profile information, to create a filtered search query for support information, to publish an install guide filtered to match the component and configuration options of the client, or to create a viewing preference for website information that gives preference to content that supports a current solution of the user for components and goals.

Use of single-sourcing or closely relating the wizard and the underlying classification scheme, removes a barrier to delivering smart content capabilities directly to a customer, in a way that is scalable from simple to complex selection scenarios, portable across multiple applications from search to viewing and publishing, and simple to maintain and translate.

Embodiments of the disclosed process maintain in a single source document both a taxonomy or taxonomies of values used for classifying documents, and a wizard used to navigate and select from the taxonomies. The single sourcing used in an embodiment of the disclosed process ensures a selection interface and available values are always synchronized, while enabling designed selection experiences that can handle complex relationships and interdependencies not typically available as in a general-purpose selection or taxonomy navigation interface currently used.

Figure 3:
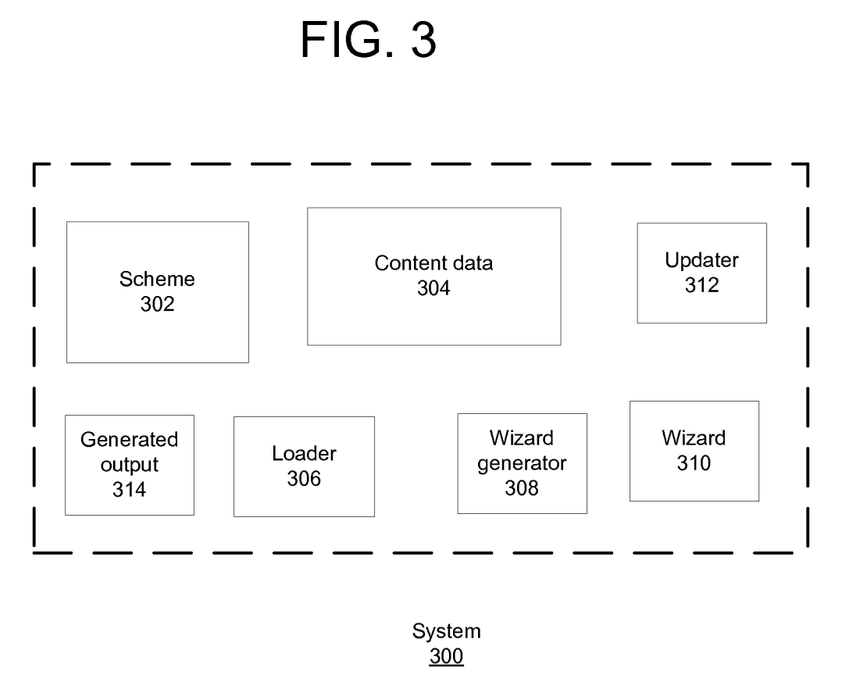
FIG. 3 is a block diagram of a system operable for various embodiments of the disclosure.

With reference to FIG. 3 a block diagram of a system operable for various embodiments of the disclosure is presented. System 300 is an example of an embodiment for managing a classification scheme and associated selection mechanism.

System 300 comprises a number of components, which may be implemented as physical components, logical components or some combination in hardware, software or combination thereof. System 300 leverages support of an underlying data processing system including systems as in network data processing system 100 of FIG. 1 and data processing system 200 of FIG. 2 using existing operating system device and communication support provided in the underlying system.

System 300 comprises a number of function components, which may be implemented as discrete elements or combined in some manner to form logical or physical collections of function without departing the functional capability of the disclosed process. For example, components may be implemented as a monolithic structure or may be implemented as depicted as a collection of separate components.

Scheme 302 is a data structure, which provides a capability of storing definitions comprising semantic relationships among listed elements. Scheme 302 accordingly defines a list of values for selection. The list of values typically comprises properties, attributes or relationships of various elements in a particular domain of interest.

Annotations may be used in defining elements of a scheme or a list of values for a respective element may be present. A choice of entries for an element or a selection of an element from a set of elements may include options of a single choice, a selection of many or a block of a set of related choices.

Scheme 302 may be a set of schemes from which a selected scheme is chosen. A scheme in the set of schemes may be a subset of a scheme in a hierarchy of schemes. When a set of schemes is not available, a user using a text editor as is known may define a scheme. Scheme 302 may be considered as representative of a document and a path in the document may be then be viewed as representative of a subset of the scheme or the scheme itself.

Content data 304 is a data structure comprising a set of tagged data providing a capability to define data representing a particular type of content. For example, content data 304 defines chapters and topics within a document representation of a book being published. In the example using the book, chapters from a number of sources may thus be combined using a scheme, for example scheme 302, to generate resulting output 314 in the form of a book. In this manner are customized book can be dynamically produced using content data 304.

Loader 306 provides a capability of placing scheme 302 in combination with content data 304 into a memory of a data processing system for processing. An example of a loader is an XML document loader.

Wizard generator 308 provides a capability for creating the guided selection interface. A tool such as that used for building a user interface application can be used as a wizard generator. The wizard generator is dependent upon the input found in the scheme to construct object relations. The wizard generator is therefore context sensitive or aware with respect to the scheme used, such as scheme 302. Wizard generator 308 creates wizard 310. Wizard 310 provides a capability to select and retrieve filtered content from content data 304 using relationships and definitions provided in scheme 302.

Updater 312 provides a capability of modifying the entries contained with scheme 302. An example of updater 312 may be a general-purpose text editor as typically used in a data processing system. For example, when used files which are defined using XML syntax and semantics, an editor capable of entering and modifying XML data is a good choice of an updating tool. Having wizard 310 generated by wizard generator 308 accordingly to information in scheme 302 enables wizard 310 to be continually synchronized with scheme 302.

Figure 4:
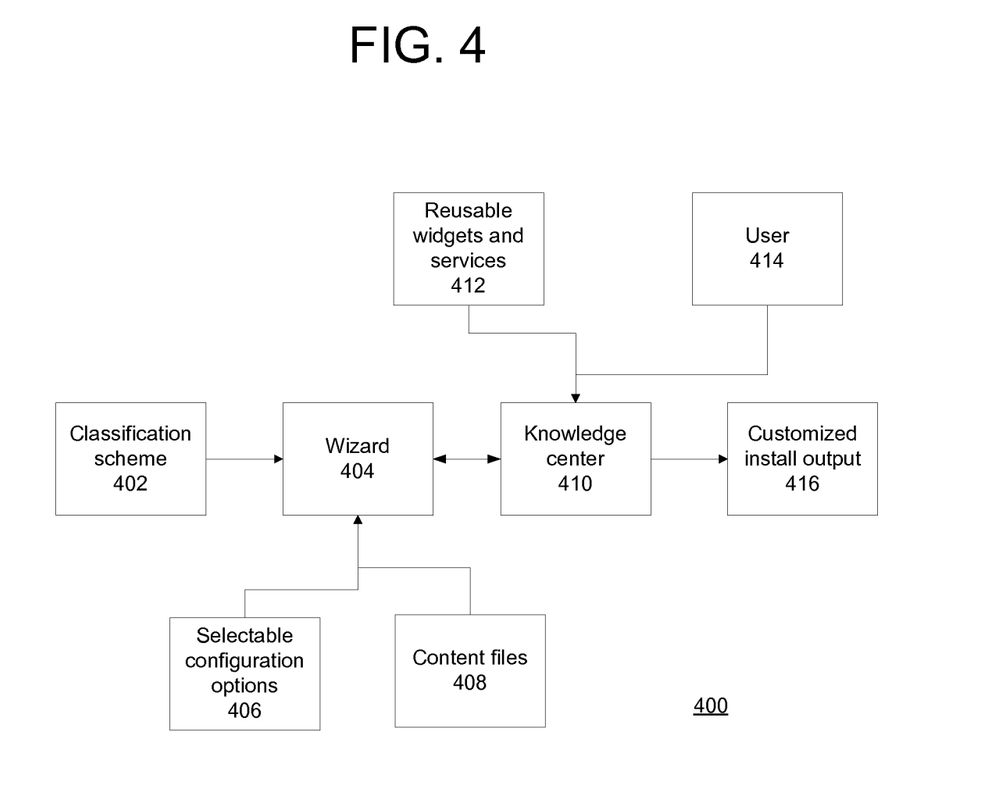
FIG. 4 is a block diagram of a data flow using the system of FIG. 3 operable for various embodiments of the disclosure.

With reference to FIG. 4 a block diagram of a data flow using a system operable for various embodiments of the disclosure is presented. Data flow 400 is an example of an embodiment using system 300 of FIG. 3 for managing a classification scheme and associated selection mechanism as in the disclosure.

Data flow 400 is an example of an embodiment of the disclosed process in which an application contained within knowledge center 410 uses wizard 404 generated from classification scheme 402 to enable user 414 to select from selectable configuration options 406 and publish (create) customized install output 416. The example enables service personnel (user 414) using a tool (wizard 404) to generate customized versions of a product install guide (customized install output 416).

Generating wizard 404 from classification scheme 402 implements the application, which can be incorporated directly into a collection as a delivery vehicle for technical product information. The vehicle may be referred to as a knowledge center 410 combining previous information centers and wikis, designed to serve as a one-stop shop for technical product information. Under the covers, knowledge center 410 comprises reusable widgets and services 412, enabling sharing of functionality with other applications, including wikis, content reuse repositories, and dynamic publishing applications.

Knowledge center 410 enables portability of selection results across search, browse, and publish applications. Because different products and solutions typically provide different filtering guidance, the scalability and maintainability of the solution is a required feature of design. The requirements are typically common to any information-publishing organization with diversity of content but desired centralization of content management/publishing.

A definition stage, typically performed by a content author, encompasses elements of classifications scheme 402, content files 408. The definition stage includes loading of the elements defined in the definition stage. A generation or building stage encompasses an element of creating wizard 404 using the input provided in the definition stage. A corresponding use stage encompasses configuration options or selectable filter selected by user 414 using wizard 404 to generate customized install output 416. The generated output represents stripped content selected by user 414 and customized install output 416 typically represents a viewable object.

For example, to produce a customized install guide, choices typically include an installation platform, applicable communication method, applicable data storage and other associated options. The result is a tailored output, which displays only those choices, which are applicable and accordingly needed.

Figure 5:
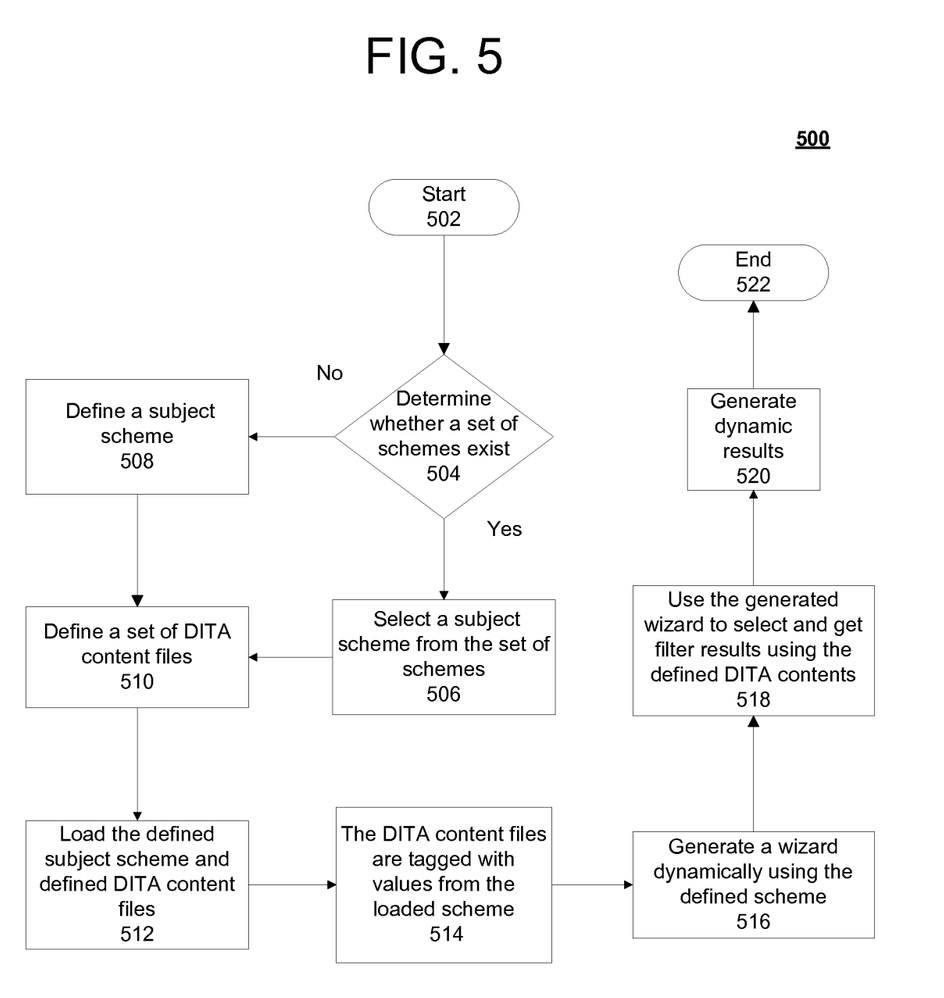
FIG. 5 is a flow chart of a process using the system of FIG. 3 operable for various embodiments of the disclosure in accordance with one embodiment of the disclosure.

With reference to FIG. 5 a flow chart of a process using a system operable for various embodiments of the disclosure is presented. Process 500 is an example of a process using system 300 of FIG. 3 for managing a classification scheme and associated selection mechanism as in the disclosure.

Process 500 begins (step 502) and determines whether a set of schemes exists (step 504). Responsive to a determination that a set of schemes exists, process 500 selects a subject scheme from the set of schemes (step 506). Responsive to a determination that a no set of schemes exists, process 500 defines a subject scheme (step 508). The scheme in the set of schemes may be authored as an XML file representing a taxonomy with additional information in grouping elements and attributes. The scheme further comprises the definition of classification tags and additional annotations such as attributes, groupings and labels.

Process 500 defines a set of DITA content files (step 510). The DITA content files represent content data defined in accordance with DITA standards. Process 500 loads the defined subject scheme and the defined DITA content files (step 512). An XML capable loader performs loading as in the illustrative embodiment, such as found in a typical XML parser. Data in the loaded DITA content files are tagged with values from the loaded scheme (step 514).

Process 500 generates a wizard dynamically using the defined scheme (step 516). Information in the defined scheme provides the filtering criteria and semantic relationships needed to build the wizard.

Process 500 receives input from the user interfacing with the generated wizard to select and get filter results using the defined DITA contents (step 518). Responsive to receiving the input from usage of the wizard, process 500 generates dynamic results using the defined DITA contents in combination with the selected (or defined) scheme (step 520) and terminates thereafter (step 522).

Thus is presented in an illustrative embodiment a computer-implemented process for generating a wizard. The computer-implemented process receives a scheme as an input source to form a received scheme, wherein the received scheme is a taxonomy, receives a defined set of content files to form received content files and loads the received content files and the received scheme. The computer-implemented process tags the received content files using the received scheme; and generates a wizard using the received scheme to create a generated wizard capable of use with an application utilizing the scheme, wherein a change in the received scheme is directly represented in the generated wizard.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for generating a wizard, the computer-implemented process comprising:
   receiving a scheme as an input source to form a received scheme, wherein the received scheme is a taxonomy;
   receiving a defined set of content files to form received content files;
   loading the received content files and the received scheme;
   tagging the received content files using the received scheme; and
   generating, using a processor unit, a wizard using the received scheme to create a generated wizard capable of use with an application utilizing the scheme, wherein a change in the received scheme is directly represented in the generated wizard, wherein receiving a scheme as an input source to form a received scheme further comprises:
   responsive to determination the set of schemes does not exist, prompting a user for a definition of a scheme.

2. The computer-implemented process of claim 1, wherein receiving a scheme as an input source to form a received scheme further comprises:
   determining whether a set of schemes exists;
   responsive to determination the set of schemes exist, prompting a user for a selection from among the set of schemes; and
   receiving a selected scheme from the set of schemes.

3. The computer-implemented process of claim 1, wherein the scheme is a taxonomy containing content classification information and is one of a master scheme or a subset of the master scheme to form the received scheme and wherein the scheme further comprises definitions of classification tags and additional annotations including attributes, groupings, and labels.

4. The computer-implemented process of claim 1, wherein receiving the defined set of content files to form received content files further comprises:
   content files conforming to a Darwin Information Typing Architecture specification.

5. The computer-implemented process of claim 1, wherein generating the wizard using the received scheme further comprises:
 generating an updated wizard responsive to a change in a subject scheme, wherein the generation of the wizard is dependent upon the change in the subject scheme to construct object relations in a context of the subject scheme wherein the wizard is continually synchronized with the subject scheme.

6. The computer-implemented process of claim 1, wherein generating the wizard using the received scheme to create a generated wizard further comprises:
 using a single-source for a classification scheme and a complex value selection mechanism, wherein the scheme is one of a master scheme defining a general scheme used to classify content using the scheme and a subset of the scheme for a particular selection scenario.

7. A computer program product for generating a wizard, the computer program product comprising:
 a non-transitory computer recordable-type media containing computer executable program code stored thereon, the computer executable program code executed by a processor unit to perform a method comprising:
 receiving, using the processor unit, a scheme as an input source to form a received scheme, wherein the received scheme is a taxonomy;
 receiving, using the processor unit, a defined set of content files to form received content files;
 loading, using the processor unit, the received content files and the received scheme;
 tagging, using the processor unit, the received content files using the received scheme; and
 generating, using the processor unit, a wizard using the received scheme to create a generated wizard capable of use with an application utilizing the scheme, wherein a change in the received scheme is directly represented in the generated wizard, wherein receiving a scheme as an input source to form a received scheme further comprises:
 responsive to determination that the set of schemes does not exist, prompting a user for a definition of a scheme, wherein the scheme is authored as an XML file representing a taxonomy with additional information in grouping elements and attributes.

8. The computer program product of claim 7, wherein receiving a scheme as an input source to form a received scheme further comprises:
 determining whether a set of schemes exists;
 responsive to determination that the set of schemes exist, prompting a user for a selection from among the set of schemes, wherein the scheme is authored as an XML file representing a taxonomy with additional information in grouping elements and attributes; and
 receiving a selected scheme from the set of schemes.

9. The computer program product of claim 7, wherein the scheme is a taxonomy containing content classification information and is one of a master scheme or a subset of the master scheme to form the received scheme and wherein the scheme further comprises definition of classification tags and additional annotations including attributes, groupings, and labels.

10. The computer program product of claim 7, wherein receiving the defined set of content files to form received content files further comprises:
 receiving content files conforming to a Darwin Information Typing Architecture specification.

11. The computer program product of claim 7, wherein generating the wizard using the received scheme further comprises:
 generating an updated wizard responsive to a change in a subject scheme, wherein the generation of the wizard is dependent upon the change in the subject scheme to construct object relations in a context of the subject scheme wherein the wizard is continually synchronized with the subject scheme.

12. The computer program product of claim 7, wherein generating the wizard using the received scheme to create a generated wizard further comprises:
 using a single-source for a classification scheme and a complex value selection mechanism, wherein the scheme is one of a master scheme defining a general scheme used to classify content using the scheme and a subset of the scheme for a particular selection scenario.

13. An apparatus for generating a wizard, the apparatus comprising:
 a memory comprising computer executable program code;
 a processor unit configured to execute the computer executable program code to direct the apparatus to:
 receive a scheme as an input source to form a received scheme, wherein the received scheme is a taxonomy;
 receive a defined set of content files to form received content files;
 load the received content files and the received scheme;
 tag the received content files using the received scheme; and
 generate a wizard using the received scheme to create a generated wizard capable of use with an application utilizing the scheme, wherein a change in the received scheme is directly represented in the generated wizard, wherein the processor unit executes the computer executable program code to receive a scheme as an input source to form a received scheme further directs the apparatus to:
 responsive to determination that the set of schemes does not exist, prompt a user for a definition of a scheme, wherein the scheme is authored as an XML file representing a taxonomy with additional information in grouping elements and attributes.

14. The apparatus of claim 13, wherein the processor unit executes the computer executable program code to receive a scheme as an input source to form a received scheme further directs the apparatus to:
 determine whether a set of schemes exists;
 responsive to determination the set of schemes exist, prompt a user for a selection from among the set of schemes, wherein the scheme is authored as an XML file representing a taxonomy with additional information in grouping elements and attributes; and
 receive a selected scheme from the set of schemes.

15. The apparatus of claim 13, wherein the scheme is a taxonomy containing content classification information and is one of a master scheme or a subset of the master scheme to form the received scheme and wherein the scheme further comprises definitions of classification tags and additional annotations including attributes, groupings, and labels.

16. The apparatus of claim 13, wherein the processor unit executes the computer executable program code to receive the defined set of content files to form received content files further directs the apparatus to:
 receive content files conforming to a Darwin Information Typing Architecture specification.

17. The apparatus of claim 13, wherein the processor unit executes the computer executable program code to generate the wizard using the received scheme further directs the apparatus to:

generate an updated wizard responsive to a change in a subject scheme, wherein the generation of the wizard is dependent upon the change in the subject scheme to construct object relations in a context of the subject scheme wherein the wizard is continually synchronized with the subject scheme.

* * * * *